May 14, 1935. W. L. STENSGAARD 2,001,222
SUPPORTING APPARATUS
Filed May 17, 1933 7 Sheets-Sheet 1
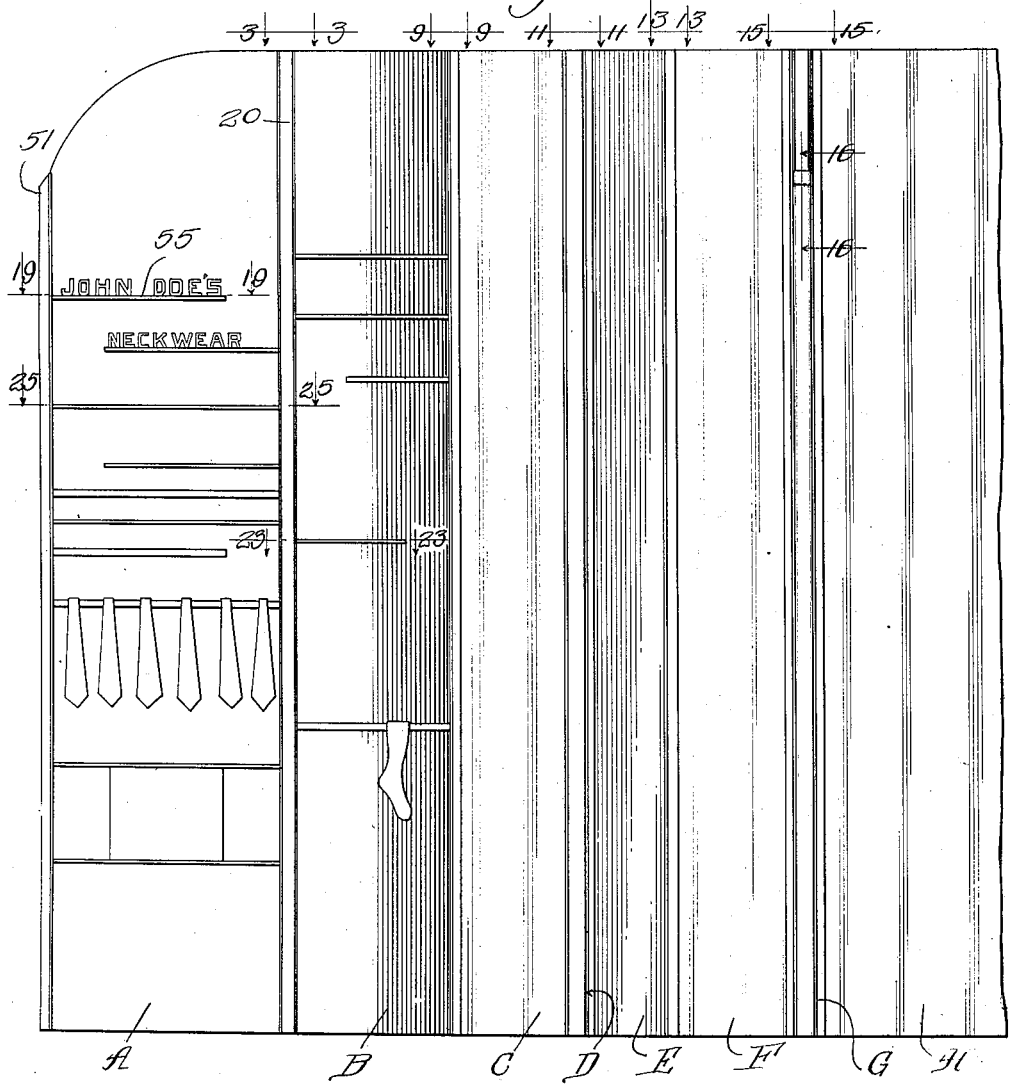
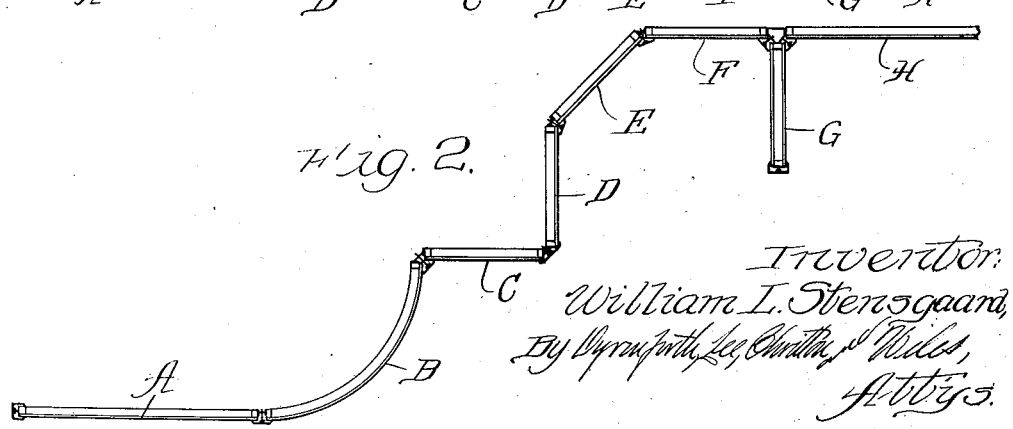

May 14, 1935. W. L. STENSGAARD 2,001,222
SUPPORTING APPARATUS
Filed May 17, 1933 7 Sheets-Sheet 2
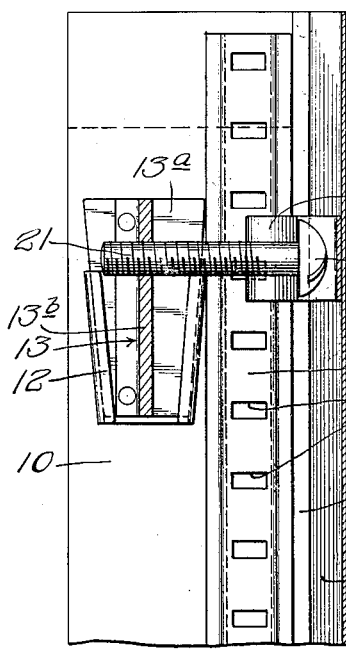
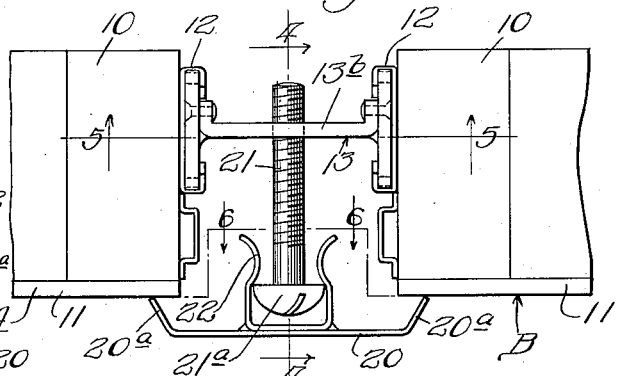
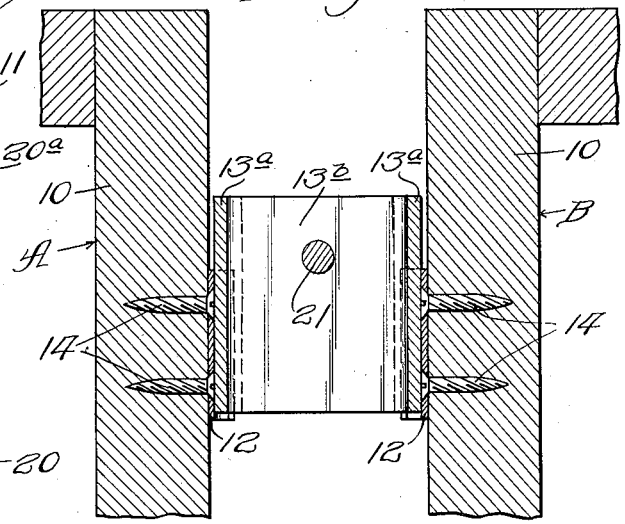
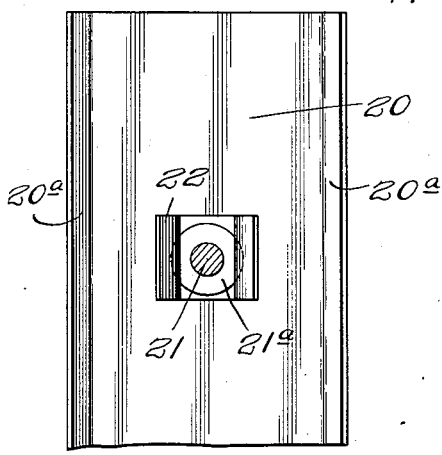
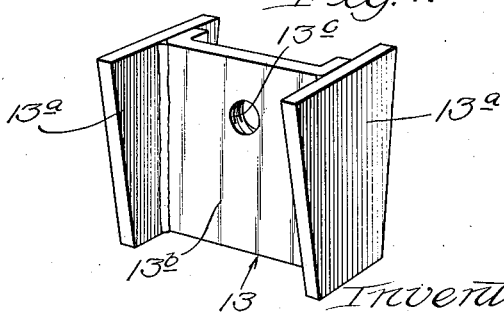
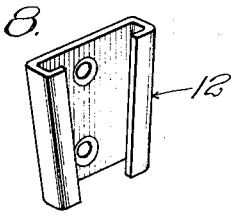
Inventor:
William L. Stensgaard,
By Dyrenforth, Lee, Chritton & Wiles,
Attys.

May 14, 1935.  W. L. STENSGAARD  2,001,222
SUPPORTING APPARATUS
Filed May 17, 1933    7 Sheets-Sheet 3
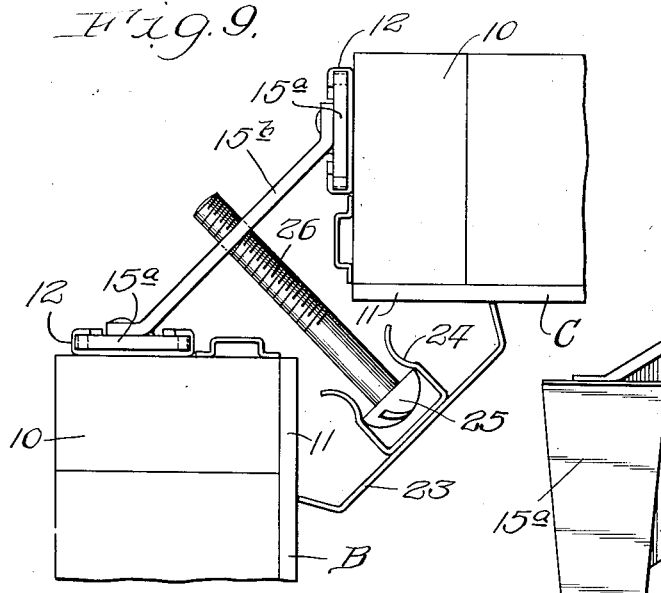
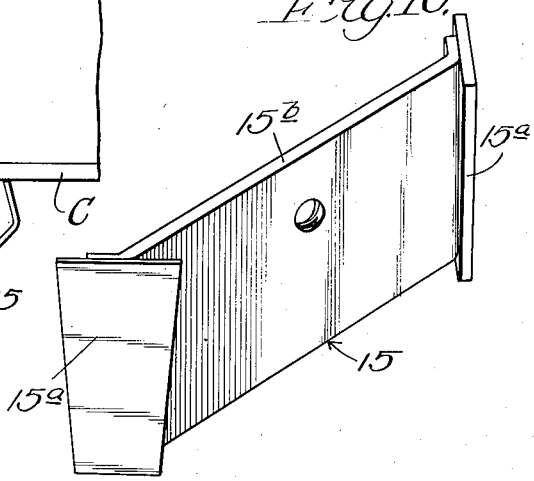
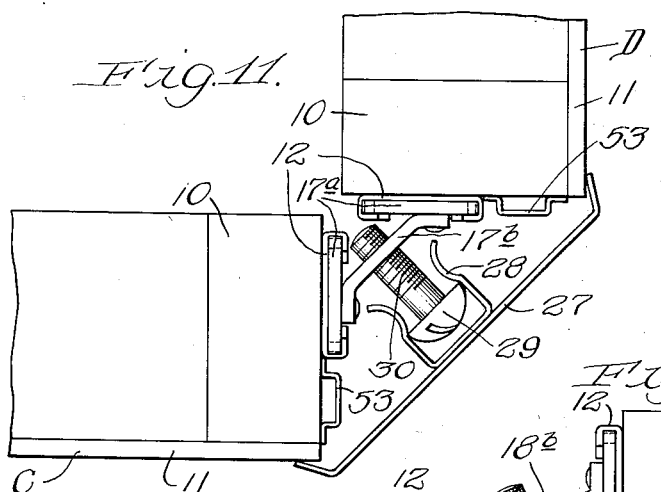
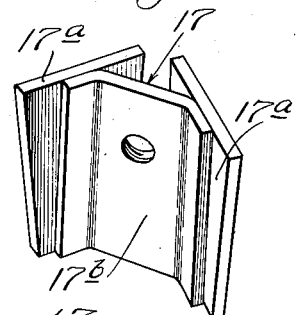
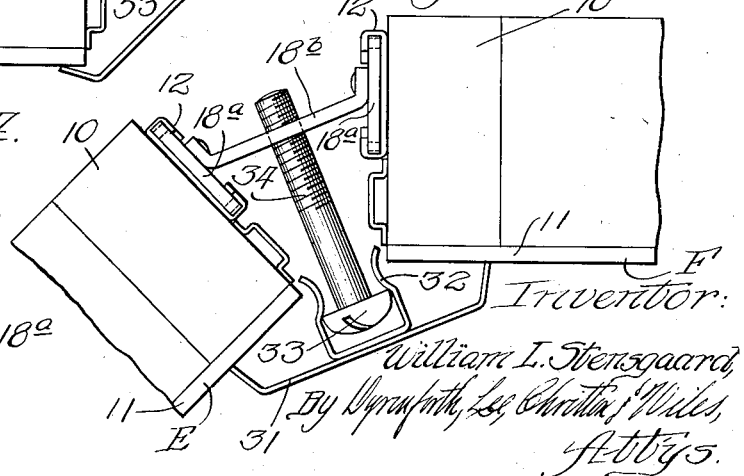

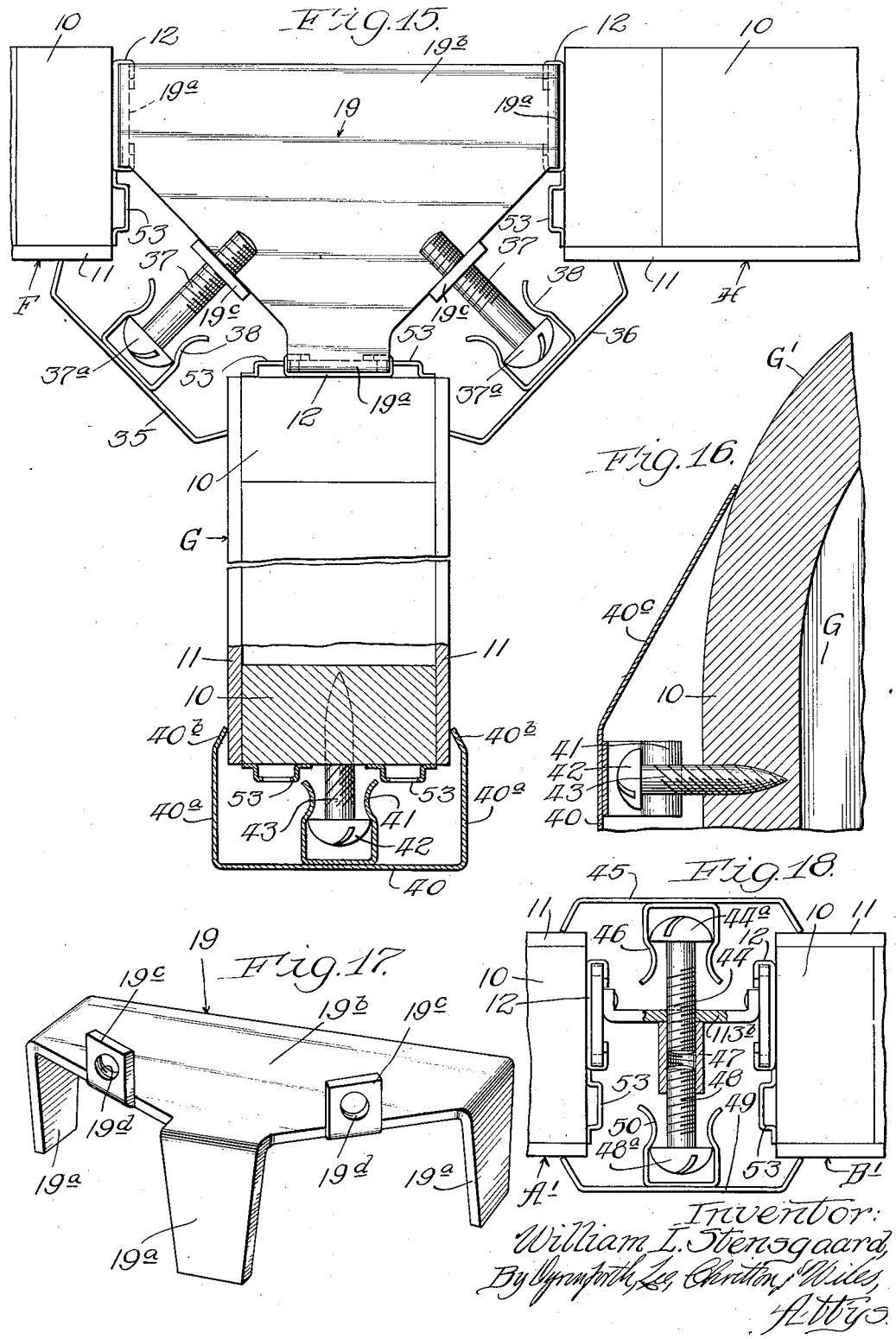

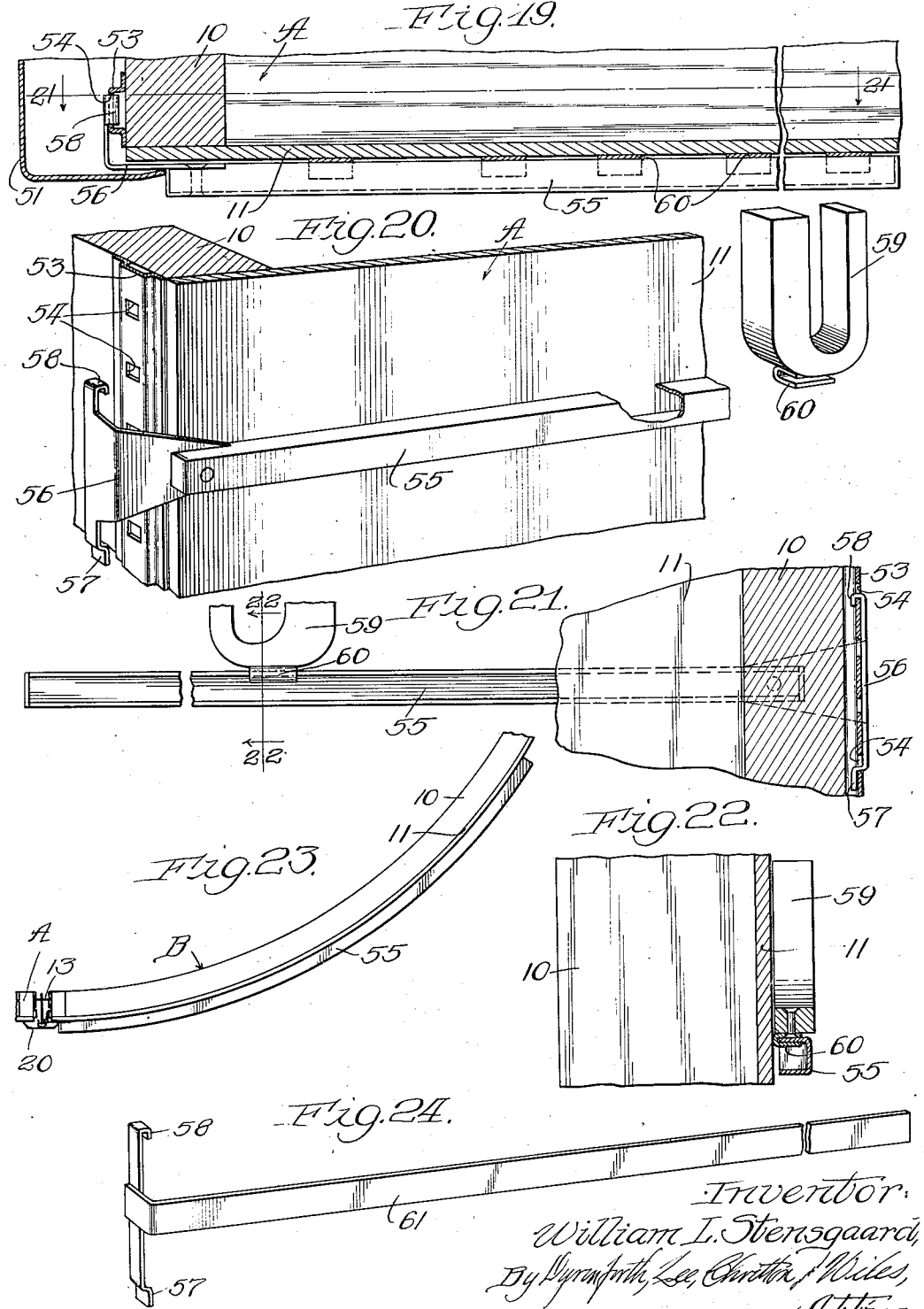

May 14, 1935.  W. L. STENSGAARD  2,001,222
SUPPORTING APPARATUS
Filed May 17, 1933  7 Sheets-Sheet 6
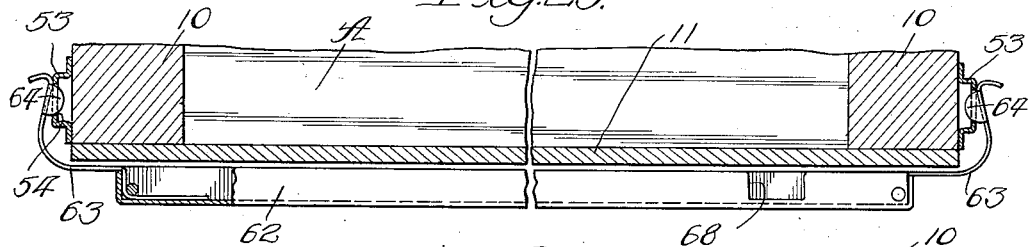
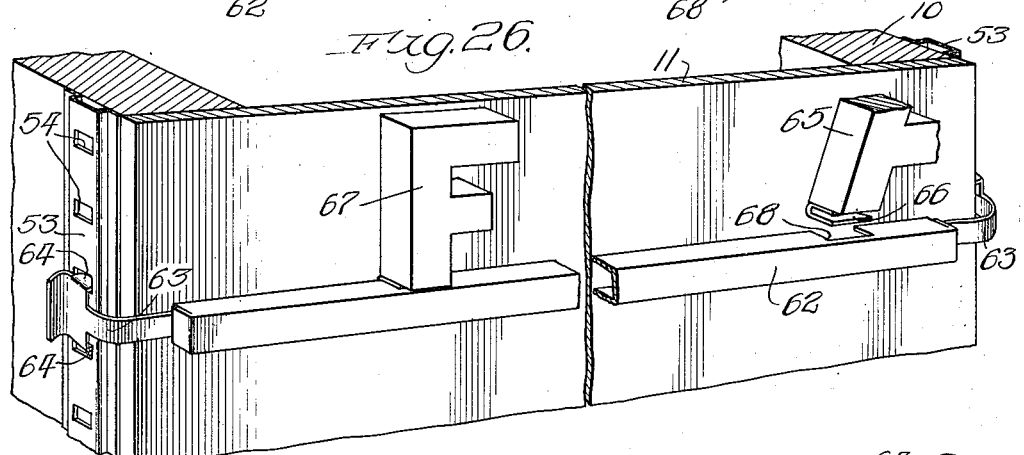
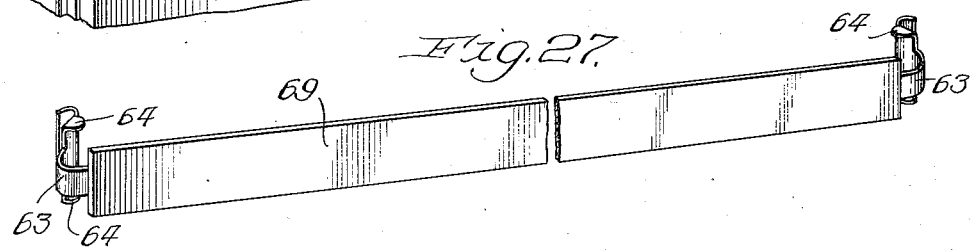
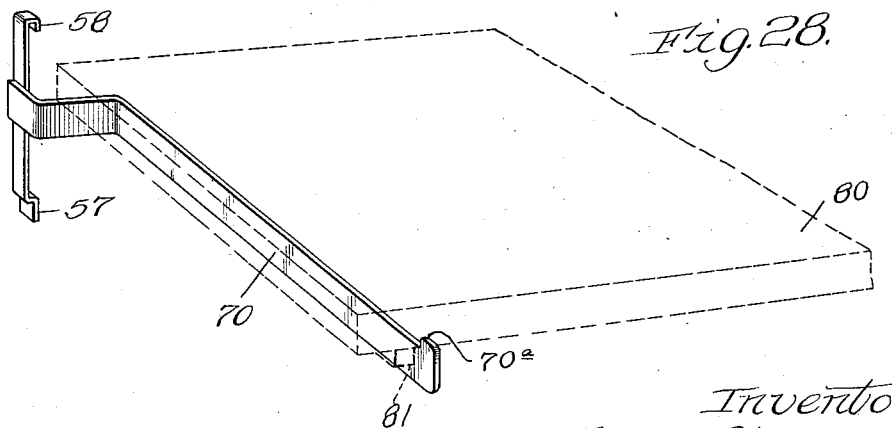
Inventor:
William L. Stensgaard

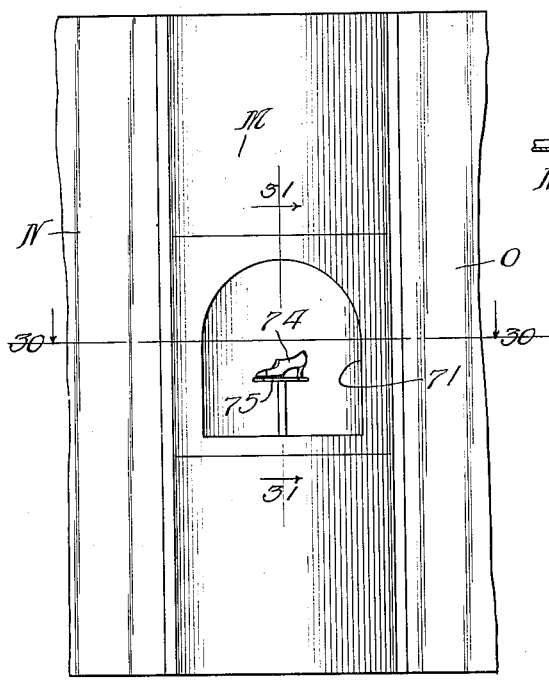
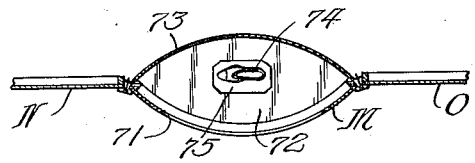
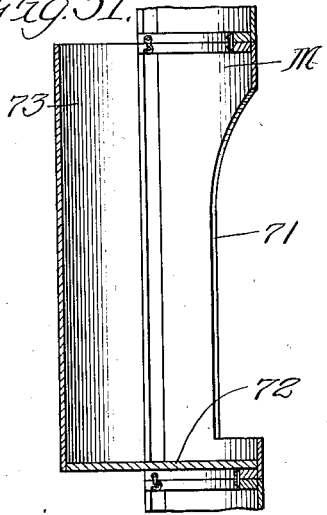
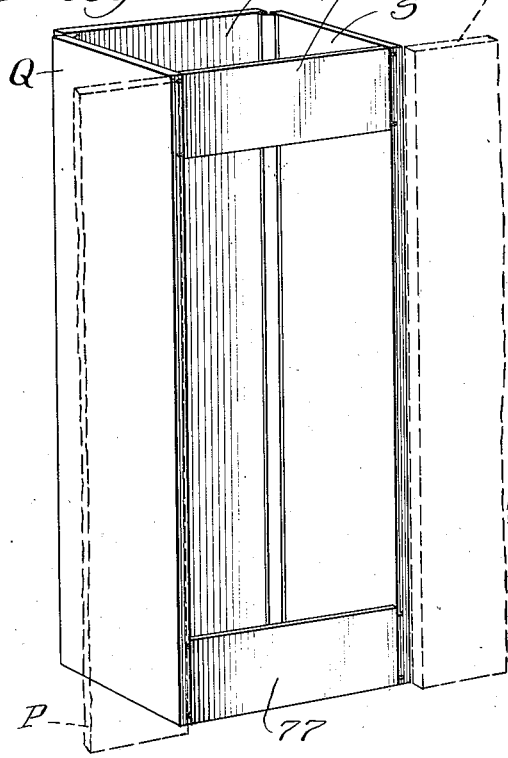
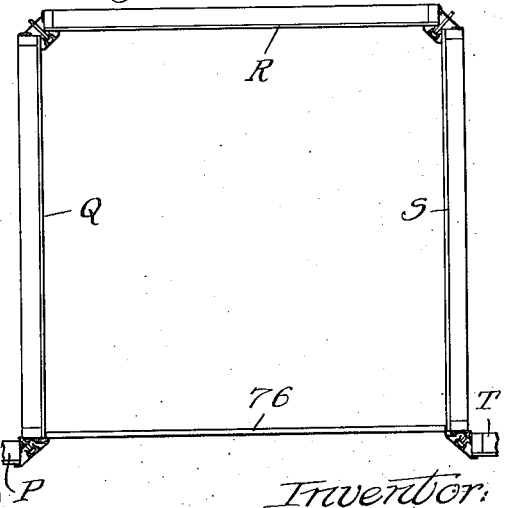

Patented May 14, 1935

2,001,222

UNITED STATES PATENT OFFICE 2,001,222

SUPPORTING APPARATUS

William L. Stensgaard, Chicago, Ill.

Application May 17, 1933, Serial No. 671,561

5 Claims. (Cl. 189—34)

This invention relates to improvements in display and supporting apparatus and, more especially, to such apparatus designed for supporting panels, wall sections, screens, sheet material, and the like, and displaying merchandise, letters, advertising matter, and the like, thereon.

My invention is particularly suitable, for example, for supporting displays in show windows, stores, and the like. Such displays may comprise flat or curved panels suitably joined together and supported with my improved apparatus, such panels adapted for the display of advertising matter, letters and merchandise itself supported on said panels, also, by the use of my improved apparatus.

Although my improved apparatus is particularly adapted for advertising and display purposes, it is to be understood that it is capable of innumerable other uses. In any case where it is desirable to support panels, wall sections, and the like, or attach the same together, or mount letters, merchandise or other articles on the face thereof, my improved apparatus can be used to advantage.

In the exemplification of my invention contained in this specification and claims, with the accompanying drawings, I have shown the employment of panels, each made of a suitable frame supporting thereon suitable sheet material. It is to be understood, however, that my invention is not to be limited by such showing. My improved apparatus may be employed with any kind of panel, wall section, or piece of sheet material.

Other features and advantages of my invention will appear more fully as I proceed with my specification. In those forms of devices embodying the features of my invention shown in the accompanying drawings—

Figure 1 is a view in front elevation; Fig. 2 is a top plan view; Fig. 3 is a view taken as indicated by the line 3 of Fig. 1; Fig. 4 is a view taken as indicated by the line 4 of Fig. 3; Fig. 5 is a view taken as indicated by the line 5 of Fig. 3; Fig. 6 is a view taken as indicated by the line 6 of Fig. 3; Fig. 7 is a perspective view of one of the connecting units; Fig. 8 is a perspective view of one of the sockets; Fig. 9 is a view taken as indicated by the line 9 of Fig. 1; Fig. 10 is a view in perspective of a connecting unit; Fig. 11 is a view taken as indicated by the line 11 of Fig. 1; Fig. 12 is a view in perspective of a connecting unit; Fig. 13 is a view taken as indicated by the line 13 of Fig. 1; Fig. 14 is a view in perspective of a connecting unit; Fig. 15 is a view taken as indicated by the line 15 of Fig. 1; Fig. 16 is a view taken as indicated by the line 16 of Fig. 1; Fig. 17 is a view in perspective of a connecting unit; Fig. 18 is a view similar to Fig. 3 showing a modification; Fig. 19 is a view taken as indicated by the line 19 of Fig. 1; Fig. 20 is a view in perspective showing a supporting bar; Fig. 21 is a view taken as indicated by the line 21 of Fig. 19; Fig. 22 is a view taken as indicated by the line 22 of Fig. 21; Fig. 23 is a view taken as indicated by the line 23 of Fig. 1; Fig. 24 is a view in perspective of a supporting bar; Fig. 25 is a view taken as indicated by the line 25 of Fig. 1; Fig. 26 is a view in perspective of a supporting bar; Fig. 27 is a view in perspective of a supporting bar of a different form; Fig. 28 is a view in front elevation of a modified form; Fig. 29 is a view in front elevation of an arrangement of panels for display purposes; Fig. 30 is a view taken as indicated by the line 30 of Fig. 29; Fig. 31 is a view taken as indicated by the line 31 of Fig. 29; Fig. 32 is a view in perspective of another arrangement of panels for display purposes; and Fig. 33 is a top plan view of the panels shown in Fig. 32.

As shown in the drawings, a plurality of panels may be joined together and supported. In Figs. 1 and 2, I have illustrated eight panels thus connected together. These panels, for convenience, I have designated A, B, C, D, E, F, G and H. The particular way in which each of these panels itself is made forms no part of the present invention. For convenience, I have here considered each panel as comprising a suitable wooden frame covered with suitable sheet material, for example, wall-board or the like. Reference, for example, to Fig. 3 will show that each of the panels A includes the wooden frame members 10, 10, to which is fastened the wall-board 11, 11. The panel B is shown as curved. It is to be understood that the panels may be of any desired size, shape, or proportions, and may be flat, angular, bent, or curved, as desired.

Among the features of my invention is the provision of means for joining panels together so that they can be supported, for example, on edge, as shown in the drawings. In Figs. 3 to 8, inclusive, I have shown the means for joining together the panels A and B. Since the means for joining together different panels is very similar in all cases, it will be necessary to describe but one in detail. To the edge face of each panel I attach a tapered socket member 12. One of these socket members is shown in perspective in Fig. 8. For the purpose of joining together the panels, I provide a connecting member or unit 13, shown in perspective in Fig. 7. This connecting member is provided with opposed tapered tongues 13ª, 13ª adapted to seat in the sockets 12, 12 attached to the edges of the panels A and B. The tongues 13ª, 13ª are connected by the connecting web 13ᵇ. It is to be understood that there are preferably two or more connecting units 13 to fasten together each pair of panels. For example, there should be such a connecting unit near the top and near the bottom, with possibly additional ones between. The socket members 12 may be fastened to the panels A and B, for example, with wood screws 14.

The method of attaching the panels B and C is shown in Figs. 9 and 10. Here the edges of the panels B and C are equipped with socket members 12, as shown in Fig. 8, but the connecting unit is to be somewhat different because these panels B and C meet at right angles. The connecting unit, as indicated by 15, is shown in Fig. 10. This unit includes the angularly arranged opposed tongues 15ª, 15ª joined together by the web 15ᵇ. The tongues 15ª, 15ª seat in the sockets 12, 12 to connect the panels B and C, as shown in Fig. 9.

The connection of the panels C and D is shown in Figs. 11 and 12. Here the edges of the panels C and D carry sockets 12, as shown in Fig. 8. The connecting unit is shown in Fig. 12. This includes the angularly arranged opposed tapered tongues 17ª connected by the web 17ᵇ, the entire connecting unit being indicated by 17. The unit is shown in place in Fig. 11.

Figs. 13 and 14 show the connection between the panels E and F. Here the edges of these panels also have socket members 12. The connecting unit 18 is shown in perspective in Fig. 14; and the same includes the angularly arranged opposed tapered tongues 18ª, 18ª connected by the web 18ᵇ. The unit is shown in place in Fig. 13.

Figs. 15 and 17 show the means for connecting three panels together, for example, the panels F, G and H. Here the edge of each of these panels is provided with one or more socket members 12, as shown in Fig. 8. The connecting unit, indicated in general by 19, is shown in Fig. 17. This includes three tapered tongues 19ª, 19ª connected together at their upper extremities by the flat horizontal plate 19ᵇ. In Fig. 15 the connecting unit is shown in place holding the panels together.

It will be noted that when the panels are fastened or connected together by connecting units, the edges are somewhat separated and spaced apart. I provide pilasters for covering these spaces with means for supporting said pilasters from the connecting members. Such a pilaster between the panels A and B is indicated by 20. This includes a long flat strip with its vertical edges 20ª, 20ª bent inwardly somewhat so that they will engage the faces of the panels A and B when the pilaster is in place. I provide the following means for holding the pilaster in position. Each web 13ᵇ of a connecting unit 13 is provided with a threaded hole 13ᶜ adapted to receive a bolt 21 with a head 21ª. The pilaster 20 is provided with spring clips 22 adapted to snap over the heads 21ª of the screws 21. This construction is shown particularly in Figs. 3 and 4.

In Fig. 9, the pilaster 23 between the panels B and C is illustrated. This pilaster likewise is held in position by spring clips or jaws 24 engaging the heads 25 of screws 26 threaded into the webs 15ᵇ of the connecting units 15.

Likewise, the pilaster 27 between the panels C and D is held in position by spring clips 28 engaging the heads 29 of screws 30 threaded into the web member 17ᵇ of the connecting unit 17.

Likewise, the pilaster 31 between the panels E and F is held in position by spring clips 32 engaging the heads 33 of screws 34 threaded into the web members 18ᵇ of the connecting units 18.

In Fig. 15 I have illustrated the pilasters 35 and 36 between the panels F, G and G, H, respectively. For the purpose of supporting these pilasters, the connecting unit 19 is provided with upturned lugs or ears 19ᶜ provided with threaded holes 19ᵈ to receive the screws 37, 37. The pilasters 35 and 36 are provided with spring clips 38 adapted to be snapped over the heads 37ª of the screws 37.

In Fig. 15 I have also shown means for attaching a pilaster to an exposed end of a panel. For example, the exposed edge or end of the panel G may carry a pilaster 40. This pilaster has its edges 40ª bent backwardly and the extreme margins thereof 40ᵇ bent inwardly to engage the faces of the panel G. The pilaster is held in position by providing it with spring clips 41 adapted to be snapped over the heads 42 of screws 43 engaged in the edge of the panel, for example, these screws may be screwed into the wood frame member 10 of the panel itself. Since both faces of this panel are exposed, it is preferably provided on each side with a sheet of wallboard or similar material 11.

In Fig. 18 I have shown means for applying two pilasters over the space between panels, one pilaster being on each side of the panels. This construction resembles that shown in Fig. 3. It may be assumed, for example, that the panels A' and B' are similar to the panels A and B, and that they are joined by a connecting member resembling that shown in Fig. 7. 113ᵇ may indicate the web of this connecting unit. Here this web is threaded to receive a screw 44. The pilaster 45 on one side is provided with a spring clip 46 snapped over the head 44ª of this screw. The inner end of the screw carries a coupling 47 which receives another screw 48. The pilaster 49 on the other side is provided with a spring clip 50 snapped over the head 48ª of this other screw.

The upper end of the pilaster 40 shown in Fig. 15 is preferably bent inwardly, as indicated in Fig. 16 by 40ᶜ, to engage the front edge of the panel G, the upper portion of which is curved backwardly, as indicated by G'.

A pilaster 51 may also be applied to the free edge of the panel A (see Fig. 19) in the same manner that the pilaster 40 is applied to the free edge of the panel G (see Fig. 15).

Means are also provided for mounting horizontal bars in front of and adjacent the face of a panel. These bars may be employed for supporting letters, goods or advertising matter. For the purpose of supporting these bars, I provide vertical strips 53 on the end faces of the panels, said strips being provided with horizontal slots 54, 54. These strips are illustrated in Figs. 4, 20, 26, and in other figures. Various kinds of bars may be supported from the strips 53. For example, in Figs. 19 and 20 I have illustrated the channel bar 55 supported at one end. This support is accomplished by providing the left end of the bar with a right angle bracket 56, said bracket being provided with a lower inwardly extending tongue 57 and an upper inwardly extended hooked tongue 58. The two tongues 57 and 58 are adapted to be engaged in two of the slots 54 in the strip 53 to support the bar 55. In Fig. 19 they are shown thus engaged. The bar 55 may be employed to support suitable lettering, advertising matter or even merchandise. In Fig. 20 I have suggested the use of letters, such as the letter U, indicated by 59 on the drawings. This letter is provided with a clip 60 at the bottom adapted to engage the upper flange of the channel 55. The engagement may be effected by springing the free end of the bar 55 a slight distance away from the face of the panel A. If desired, a flat strip 61 may be employed, as shown in Fig. 24, instead of a channel bar 55. In Figs. 25 and 26 I have shown a channel bar 62 supported at each end. For this purpose, each end of the bar is provided with a right angle bracket 63 having upper and lower inwardly extending tongues 64 adapted to be sprung into the slots 54 of the strips 53 on opposed edges of the panel A. The bar 62 may also carry letters as shown in Fig. 26. For example, the letter, as indicated by 65, may have a clip 66 on the bottom to mount it on the bar 62. The letter F, indicated by 67, is shown mounted. Since the bar 62 is supported at each end, it is provided with an opening 68 near one end to permit insertion of the hook 66 on the letters. The letters may then be slid horizontally to the desired position on the bar. In Fig. 27, I have shown a bar 69 made of a flat strip. Otherwise this bar is similar to the bar 62. Merchandise may be supported over the bar 69; or signs may be suspended therefrom in any suitable manner.

In Fig. 28 I have shown a bar such as disclosed in Fig. 24 for supporting one end of a shelf. This bar is provided with an offset so that it will extend vertically from the panel instead of lying in front of it. Such a bar is indicated by 70 and the same supports one end of a shelf 80, the latter being provided with a cleat 81 to prevent sidewise displacement of the bar 70 and the bar being provided at its end with an upturned lug 70ª to prevent the shelf from slipping off of the bar. It is to be understood that a similar bar may be utilized to support the other end of the shelf (not shown). In this manner, a shelf 80 may be supported in front of a panel and used for the display of goods, merchandise and the like.

In Figs. 29, 30 and 31 I have shown means for displaying goods in a very effective manner. Such means includes the joining of a curved panel M to two adjacent panels N and O. This curved panel may be joined in the same manner that the panels D and E are joined together. The panel M is provided with a window 71. Behind this window and below it there is provided a shelf 72 with a curved back panel 73. Merchandise, as indicated by 74, may be displayed on a shelf 75 supported on the shelf 72.

If desired, an effective display may be arranged, as shown in Figs. 32 and 33, by fastening together the panels P, Q, R, S and T, as shown. This provides a recess in which goods may be displayed. If desired, connecting members 76 and 77 may be employed at the top and bottom of the panels, as shown in Fig. 32.

When a horizontal supporting bar is employed, the margin of the pilaster may be sprung out slightly to accommodate said bar or its bracket. For example, as shown in Fig. 19, the edge of the pilaster 51 is sprung out slightly to permit insertion of the bracket 56 thereunder.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A connecting unit for connecting the adjacent edges of three panels, including a horizontal plate carrying three depending tapered tongues, said plate being provided with upwardly turned lugs between said tongues, said lugs being provided with threaded holes adapted to receive screws.

2. In combination with a plurality of panels, socket-members on the edges of said panels, connecting units provided with angularly arranged tapered tongues adapted to be seated in said socket-members, said connecting units joining adjacent panels together and holding the same spaced apart when said tongues are seated in said socket-members, and a pilaster adapted to cover the space between adjacent panels when connected by the connecting units, with means engaging screws threaded in the connecting units for holding the pilaster in position.

3. In combination with a plurality of panels, socket-members on the edges of said panels, connecting units provided with angularly arranged opposed tapered tongues adapted to be seated in said socket-members, said connecting units joining adjacent panels together and holding the same spaced apart when said tongues are seated in said socket-members, and a pilaster adapted to cover the space between adjacent panels when connected by the connecting units, with means engaging screws threaded in the connecting units and holding the pilaster in position.

4. In combination with two panels, lying substantially in the same plane with their edges substantially facing each other and spaced apart; socket-members on said edges with opposed sockets; and a connecting unit, including a web-member and opposed tapered tongues rigidly mounted on the ends of said web-member and angularly disposed with relation thereto, said tongues adapted to fit in said sockets and hold said panels against relative angular swinging movement.

5. In combination with two panels lying substantially in the same plane with their edges substantially facing each other and spaced apart; a pair of socket members each having a transversely arranged flat tapered socket; and a connecting unit including a vertical web-member and transversely arranged tapered tongues rigidly mounted on said web, said tongues adapted to be seated in said sockets.

WILLIAM L. STENSGAARD.